United States Patent

Gimmler

Patent Number: 5,462,145
Date of Patent: Oct. 31, 1995

[54] HYDROKINETIC LOCKUP TORQUE CONVERTER WITH LOCKUP CLUTCH

[75] Inventor: Joachim Gimmler, Dittelbrunn, Germany

[73] Assignee: Fichtel & Sachs AG, Schweinfurt, Germany

[21] Appl. No.: 204,064

[22] Filed: Mar. 1, 1994

[30] Foreign Application Priority Data

Mar. 3, 1993 [DE] Germany .......................... 43 06 598.8

[51] Int. Cl.$^6$ ................................................ F16H 45/02
[52] U.S. Cl. ........................ 192/3.29; 192/3.3; 29/889.5
[58] Field of Search ................................ 192/3.28, 3.29, 192/3.3; 29/889.5

[56] References Cited

U.S. PATENT DOCUMENTS

| | | | |
|---|---|---|---|
| 4,199,047 | 4/1980 | Ling | 192/3.3 |
| 4,406,355 | 9/1983 | Bionaz | 192/3.3 |
| 4,926,988 | 5/1990 | Kundermann | 192/3.3 |
| 4,986,398 | 1/1991 | Olsen | 192/3.28 |
| 5,186,292 | 2/1993 | Hageman et al. | 192/3.28 |

FOREIGN PATENT DOCUMENTS 3823210  1/1990  Germany .

*Primary Examiner*—Richard M. Lorence
*Attorney, Agent, or Firm*—Nils H. Ljungman & Associates

[57] ABSTRACT

A hydrokinetic torque converter equipped with a bridging or lockup clutch. The bridging or lockup clutch has a piston and a friction plate between the piston and the converter housing. For the non-rotating connection of the piston, there is a carrier plate or hub disc, which carrier plate or hub disc is connected to the piston by means of tangential leaf springs. The carrier plate or hub disc is attached, by means of gear teeth, in a non-rotating fashion to a hub of the converter housing, such that there is no play between the hub disc and the hub in the axial direction, the circumferential direction, and the radial direction. The non-rotating connection between the hub disc and the hub can be accomplished by a deformation process.

19 Claims, 5 Drawing Sheets

HYDROKINETIC LOCKUP TORQUE CONVERTER WITH LOCKUP CLUTCH

BACKGROUND OF THE INVENTION

1. Field of the Invention

This invention relates to a hydrokinetic lockup torque converter and to the lockup clutch associated therewith.

2. Background Information

Such a torque converter is disclosed, for example, in German Laid Open Patent Application No. 3 823 210, and its corresponding U.S. Pat. No. 4,926,988 to Kundermann on May 22, 1990, entitled "Hydrodynamic Clutch". In this torque converter, the piston of the bridging or lockup clutch can be mounted tightly on the converter housing, or on the hub fastened rigidly to the converter housing. However, the piston can be mounted so that it can move axially, whereby the piston's non-rotating attachment to the converter housing can be accomplished by means of a carrier plate or hub disc. The carrier plate or hub disc can be located between the piston and the converter housing, and the carrier plate or hub disc can be connected to the piston by means of tangential leaf springs. The carrier plate or hub disc can be guided in a non-rotating manner by means of gear teeth. These gear teeth can preferably be disposed on the inside diameter of the carrier plate or hub disc, and can engage with external teeth on the hub. With this design, during idling of the internal combustion engine, and when the bridging or lockup clutch is open, rattling noises can be generated by the uneven running of the internal combustion engine, since the piston and the carrier plate or hub disc are preferably not linked to the converter housing with little or no play.

OBJECT OF THE INVENTION

The object of the present invention is therefore to create a non-rotating connection of the piston, which does not have the disadvantages of the connections used in the past.

SUMMARY OF THE INVENTION

The present invention teaches that this object can be achieved by means of by means of a hydrokinetic lockup torque converter, such as for an automobile, the lockup torque converter comprising: a turbine wheel being disposed on a drive shaft; a converter housing being configured to be driven by the drive shaft of an internal combustion engine and to house the torque converter; a lockup clutch being disposed between the turbine wheel and the converter housing and configured to couple the turbine wheel to the converter housing; the lockup clutch comprising: a piston, the piston being disposed between the converter housing and said turbine wheel; a friction plate, the friction plate being disposed between the piston and the converter housing; an axis of rotation; the torque converter defining: an axial direction substantially parallel to the axis of rotation; a circumferential direction about the axis of rotation; a radial direction substantially perpendicular to the axial direction; a first hub, the first hub being disposed and fastened to rotate with the converter housing about the axis of rotation; said piston being disposed about the first hub to move in the axial direction along the first hub; a hub disc, the hub disc being mounted on the first hub and disposed between the turbine wheel and the piston; and means for connecting the piston and the hub disc, the connecting means for attaching and driving the piston and the hub disc as a unit about the axis of rotation.

By locating the carrier plate or hub disc preferably on the side of the piston facing away from the converter housing, it may be possible to create an essentially rigid or stationary circumferential connection between the carrier plate or hub disc and the hub, so that both the carrier plate or hub disc and the piston can preferably no longer execute a movement relative to the converter housing. The connection can thereby be made in several ways, one of which may be by welding.

The invention also teaches that it may be particularly advantageous if the hub, in the vicinity of the carrier plate or hub disc, has a preferably concentric, open groove preferably facing away from the converter housing, so that a ring land can be formed on the hub which ring land can be plastically deformed radially outward. Such a configuration can be easy to manufacture and install, since during the installation process, a certain play can be present, which play can be essentially eliminated by a deformation process preferably following installation.

The invention also teaches that in an additional advantageous configuration, the carrier plate or hub disc can have internal teeth, into which internal teeth the ring land can be plastically deformed. In this manner, a very secure transmission of the torque can essentially be guaranteed, and the deformation process can be executed with particular ease.

The invention also teaches that the tangential leaf springs can preferably exert an axial prestress on the piston, preferably to reduce the distance between the piston and the converter housing. This arrangement can essentially guarantee that the bridging clutch or lockup clutch can be engaged within a very brief period of time.

One aspect of the invention resides broadly in a hydrokinetic lockup torque converter, such as for an automobile, the lockup torque converter comprising: a turbine wheel being disposed on a drive shaft; a converter housing being configured to be driven by the drive shaft of an internal combustion engine and to house the torque converter; a lockup clutch being disposed between the turbine wheel and the converter housing and configured to couple the turbine wheel to the converter housing; the lockup clutch comprising: a piston, the piston being disposed between the converter housing and said turbine wheel; a friction plate, the friction plate being disposed between the piston and the converter housing; an axis of rotation; the torque converter defining: an axial direction substantially parallel to the axis of rotation; a circumferential direction about the axis of rotation; a radial direction substantially perpendicular to the axial direction; a first hub, the first hub being disposed and fastened to rotate with the converter housing about the axis of rotation; said piston being disposed about the first hub to move in the axial direction along the first hub; a hub disc, the hub disc being mounted on the first hub and disposed between the turbine wheel and the piston; and means for connecting the piston and the hub disc, the connecting means for attaching and driving the piston and the hub disc as a unit about the axis of rotation.

Another aspect of the invention resides broadly in a a hydrokinetic lockup torque converter, such as for an automobile, the lockup torque converter comprising: a turbine wheel being disposed on a drive shaft; a converter housing being configured to be driven by the drive shaft of an internal combustion engine and to house the torque converter; a lockup clutch being disposed between the turbine wheel and the converter housing and configured to couple the turbine wheel to the converter housing; the lockup clutch comprising: a piston, the piston being disposed between the converter housing and the turbine wheel; a friction plate, the friction plate being disposed between the piston and the converter housing; an axis of rotation; the torque converter defining: an axial direction substantially parallel to the axis of rotation; a circumferential direction about the axis of rotation; a radial direction substantially perpendicular to the axial direction; a first hub, the first hub being disposed and fastened to rotate with the converter housing about the axis of rotation; the piston being disposed about the first hub to move in the axial direction along the first hub; a hub disc, the hub disc is fastened rigidly and immovably to the first hub to provide no play between the hub disc and the first hub in all three of the axial direction, the circumferential direction, and the radial direction; and means for connecting the piston and the hub disc, the connecting means for attaching and driving the piston and the hub disc as a unit about the axis of rotation.

Another aspect of the invention resides broadly in a method of making a hydrokinetic lockup torque converter, such as for an automobile, the lockup torque converter comprising: a turbine wheel being disposed on a drive shaft; a converter housing being configured to be driven by the drive shaft of an internal combustion engine and to house the torque converter; a lockup clutch being disposed between the turbine wheel and the converter housing and configured to couple the turbine wheel to the converter housing; the lockup clutch comprising: a piston, the piston being disposed between the converter housing and the turbine wheel; a friction plate, the friction plate being disposed between the piston and the converter housing; an axis of rotation; the torque converter defining: an axial direction substantially parallel to the axis of rotation; a circumferential direction about the axis of rotation; a radial direction substantially perpendicular to the axial direction; a first hub, the first hub being disposed and fastened to rotate with the converter housing about the axis of rotation; the piston being disposed about the first hub to move in the axial direction along the first hub; a hub disc, the hub disc being mounted on the first hub and disposed between the turbine wheel and the piston; and means for connecting the piston and the hub disc, the connecting means for attaching and driving the piston and the hub disc as a unit about the axis of rotation; said method of making a torque converter comprising the steps of: providing a turbine wheel; disposing the turbine wheel on the drive shaft; providing a converter housing; configuring the converter housing to be driven by the drive shaft of an internal combustion engine and to house the torque converter; providing a lockup clutch; disposing the lockup clutch between the turbine wheel and the converter housing; configuring the lockup clutch to couple the turbine wheel to the converter housing; said providing of said lockup clutch comprising: providing a piston; disposing the piston between the converter housing and the turbine wheel; providing a friction plate; disposing the friction plate between the piston and the converter housing; providing a first hub; disposing the first hub and fastening the first hub to rotate with the converter housing about the axis of rotation; disposing the piston about the first hub to move in the axial direction along the first hub; providing a hub disc; mounting the hub disc on the first hub; providing means for connecting; deforming the outer portion of the first hub to make contact with and be received by the means for receiving to fasten the hub disc rigidly and immovably to the first hub to provide no play between the hub disc and the first hub in all three of the axial direction, the circumferential direction, and the radial direction; and attaching and driving the piston and the hub disc as a unit about the axis of rotation with the connecting means.

BRIEF DESCRIPTION OF THE DRAWINGS

The invention is explained in greater detail below with reference to the example illustrated in the accompanying drawings in which.

DESCRIPTION OF THE PREFERRED EMBODIMENTS

Figure 1A:
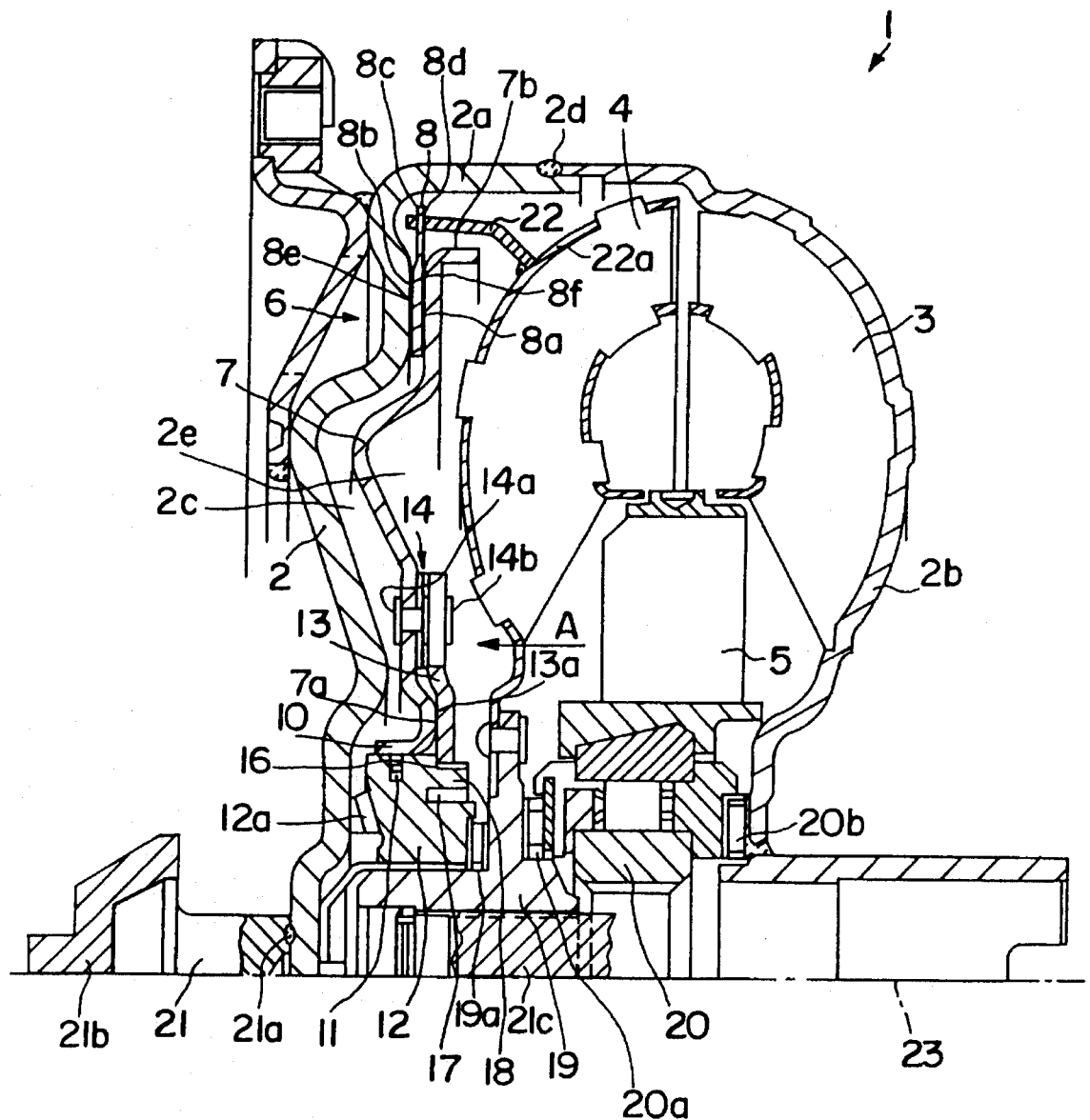
FIG. 1a shows the top half of a longitudinal section through a torque converter.

As shown in FIG. 1a, torque converter 1, with all of its individual components, can preferably be oriented concentric to an axis of rotation 23. During operation, the torque converter 1 can rotate around this axis of rotation 23. The torque converter 1 can preferably be driven by the crankshaft 216 of an internal combustion engine, whereby the converter housing wall 2 can be guided by means of a stationary journal or guide hub 21 in a corresponding hole of the crankshaft 216. The torque transmission can take place by means of elements not shown in any additional detail. The converter housing or housing wall 2 preferably encloses the entire interior of the torque converter 1, and can also contain the pump wheel 3. The turbine wheel 4 can be independent of the pump wheel 3, and can preferably be located in a similar manner as turbine wheels in torque converters of this type. By means of the hub 19 of the turbine wheel 4, the turbine wheel 4 can be located in a non-rotating fashion on a transmission shaft 2c. In the hydrodynamic or hydrokinetic circuit, between the pump wheel 3 and the turbine wheel 4, there can also preferably be a guide wheel or stator 5, which can be located on a hub 20, with the preferable interposition of a free wheel. The hub 20 can then preferably be installed in a non-rotating fashion on a hollow shaft (not shown).

The bridging or lockup clutch 6 can preferably be located in the axial direction, preferably between the turbine wheel 4 and the converter housing wall 2. The bridging or lockup clutch 6 can have, among other things, the piston 7, as a component thereof. The piston 7, in its radially inner area, can be mounted over an axially projecting collar 10 on a cylindrical outside contour of the hub 12. The hub 12 can then be rigidly connected to the converter housing wall 2, by means well known in the art. Preferably between the collar 10 and the hub 12, there can be a seal 11. As shown in FIG. 1a, in the radially outer area of the piston 7, there can be a frictional surface such as surface 8a. The frictional surface 8a of the piston 7 can point or face towards the converter housing wall 2, whereby the converter housing wall 2 can also have a frictional surface 8b. Between the frictional surface 8a of the piston 7 and the frictional surface 8b of the converter housing wall 2, the friction plate 8 can extend inward from radially outside, and the friction plate 8 can also have two frictional surfaces 8e and 8f, preferably disposed adjacent frictional surfaces 8b and 8a, respectively. The frictional surfaces 8e and 8f of the friction plate 8 can be disposed on opposite sides of the friction plate 8.

The friction plate 8 can be connected so that the friction plate 8 does not rotate, possibly relative to the turbine wheel 4, but the friction plate 8 can preferably move axially, by means of a connecting rim 22. The connecting rim 22 can preferably be attached directly to the turbine wheel 4. It can also be possible, however, to have torsion-damping means inside the connecting rim 22.

Figure 2A:
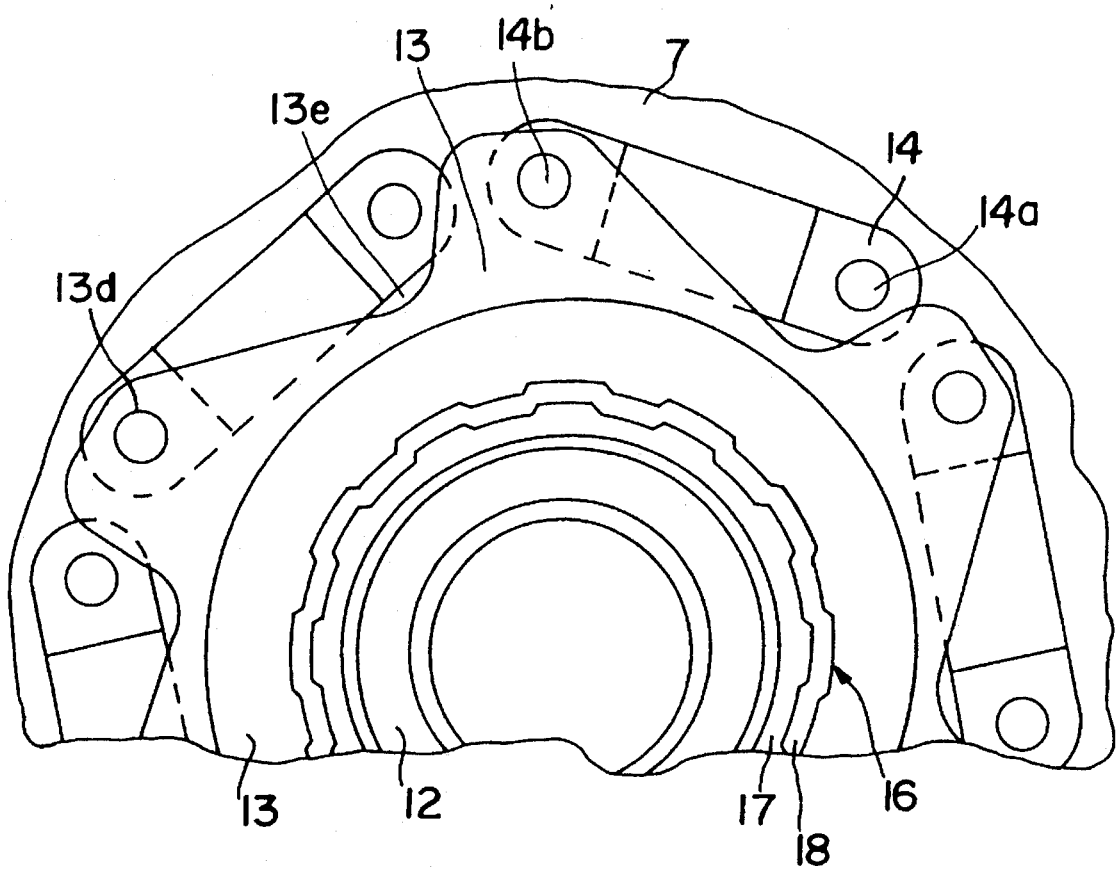
FIG. 2a shows the top half of a view A in FIG. 1a, from the turbine wheel toward the piston.

The non-rotating attachment of the piston 7 to the converter housing 2 can be made by means of a carrier plate or hub disc 13. The carrier plate or hub disc 13 can preferably be located between the piston 7 and the turbine wheel 4. The carrier plate or hub disc 13 can then be fastened to the hub 12, so that the carrier plate or hub disc 13 neither rotates nor moves axially, possibly relative to the converter housing 2. As best shown in FIG. 2a, the carrier plate or hub disc 13 can have internal toothing 16, preferably on its inside diameter. The internal toothing 16 permits the carrier plate or hub disc 13 to be placed on the hub 12. In a direction radially inward from the internal toothing 16, there can be an open groove 17. The open groove 17 can run concentrically in the hub 12, pointing away from the converter housing wall 2, so that a ring land 18 can be formed in the hub 12. The ring land 18 is thus preferably disposed between the groove 17 and the internal toothing 16. The ring land 18 can be plastically deformed radially outward, so that the material of the hub 12 can preferably penetrate into the internal toothing 16 of the carrier plate or hub disc 13. This penetration by the ring land 18 of the hub 12, preferably into the internal toothing 16, can make possible an easy circumferential and axial fastening of the carrier plate or hub disc 13 on the hub 12. Thus, the ring land 18 of the hub 12 may be composed of adequate material which material may be capable of being deformed. Further, the fastening between the carrier plate or hub disc 13 to the internal toothing 16 can be rigid and essentially immovable.

Figure 4:
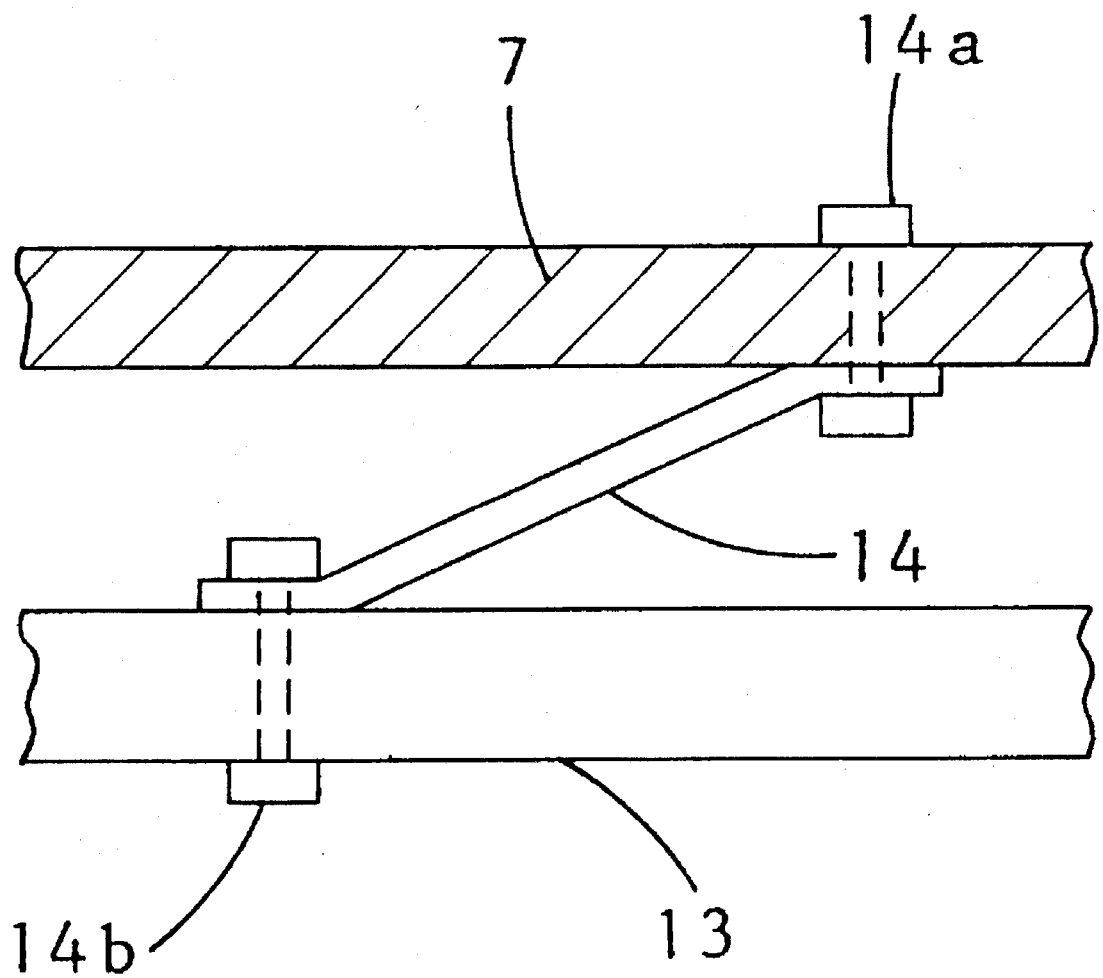
FIG. 4 shows a side view of a single leaf spring.

The piston 7 and the carrier plate or hub disc 13 can preferably be connected to one another by means of tangential leaf springs 14. Such leaf springs 14 can preferably provide a non-rotating connection between the piston 7 and the carrier plate or hub disc 13, while still allowing the piston 7 to move axially, possibly with respect to the carrier plate or hub disc 13. A component, preferably comprising the piston 7, the carrier plate or hub disc 13, and the tangential leaf springs 14, pre-assembled in the manner discussed above, can be placed on the hub 12 with the preferable interposition of the friction plate 8. The ring land 18 can then be plastically deformed radially outward, so that the carrier plate or hub disc 13 can be connected rigidly to the hub 12, without axial play, and also without circumferential play. The tangential leaf springs 14 can thereby be given an axial prestress, to prestress the piston 7 toward the converter housing 2, as shown in FIG. 4.

To provide such a radial deformation, the hub 12 can be manufactured or made to preferably include a groove 17, which groove 17 can be disposed concentrically within the hub 12. This groove 17 can preferably be disposed radially inward from the ring land 18. The ring land 18 can be disposed near the outermost portion of the circumference of the hub 12. The ring land 18 can, in one embodiment, be manufactured to have a substantially smooth surface. A preformed tool can then be inserted into the groove 17, preferably for the purpose of deforming the ring land 18. The tool can have a shape similar to the contour of the internal toothing 16 of the carrier plate or hub disc 13. With the aid of this tool and an applied pressure, the tool can be forced into the groove 17 to force the ring land 18 radially outwardly into the internal toothing 16, to possibly form a cold weld or pressure weld. The deformation of the ring land 18 into the internal teeth 16 can be an essentially permanent connection between the carrier plate or hub disc 13 and the hub 12. This connection can serve to prevent rattling due possibly to transmission vibrations.

A housing wall 2a of the torque converter 1 can preferably be driven by an internal combustion engine, not shown. The housing wall 2a can comprise the converter housing wall 2, and a remote housing wall 2b. The converter housing wall 2 can be firmly connected to the journal guide hub 21 by a weld 21a, in the radially inner area of the converter housing wall 2. Further, the remote housing wall 2b can be connected to the housing wall 2a preferably by a weld 2d. The journal or guide hub 21 can be radially guided by an extension in the flywheel or in the crankshaft 216 of the internal combustion engine (not shown). The remote housing wall 2b can be combined with the pump wheel 3 of the torque converter 1, to preferably form one unit. Between the pump wheel 3 and the drive-side housing wall 2, the turbine wheel 4 can be disposed. The turbine wheel 4 can be firmly connected with the turbine wheel hub 19, which hub 19 can be mounted by a set of teeth on a take-off shaft (not shown). Between the turbine wheel 4, and the pump wheel 3, the guide wheel or stator 5 can be disposed. The guide wheel 5 can be guided by a freewheel on the hub 20, which hub 20 can be mounted by a set of teeth on a tube or hollow shaft (not shown), which tube can be fixed to the housing.

The piston 7 of the bridging or lockup clutch can be disposed between the turbine wheel 4 and the housing wall 2. The piston 7 can be axially slidably mounted to the hub 12 by the flange 10. The flange 10 preferably points towards or faces the converter housing wall 2. The piston 7 can preferably be sealed against the hub 12 by a seal 11. The piston 7 can be provided with a stiffening flange 7b, in the outer circumferential area of the piston 7, the flange 7b preferably pointing away from the converter housing wall 2. The piston 7 can also be provided with the friction surface 8a in the outer circumferential area of the piston 7, which friction surface 8a can face towards the converter housing wall 2. In an alternative embodiment not shown, friction surface 8a of the piston 7 can possibly comprise a friction plate welded to the piston 7. The converter housing wall 2 can also have a friction surface 8b, which friction surface 8b can be disposed opposite the friction surface 8a of the piston 7. In an alternative embodiment, friction surface 8b of the converter housing wall 2 can also possibly comprise a friction plate welded to the housing wall 2.

The friction plate 8 can be disposed between friction surface 8a and friction surface 8b, and can have its own friction surfaces 8e and 8f. The friction plate 8 can extend radially outwardly, preferably beyond the piston 7, and can be radially guided by an extension in the flywheel or in the crankshaft 216 of the internal combustion engine (not shown). The friction plate 8 can comprise at least one nose 8c and slits 8d, for a circumferentially rigid, but axially loose connection between the friction plate 8 and the connecting rim 22. The preferably hollow connecting rim 22 can then be firmly connected to the turbine wheel 4. The connecting rim 22 can be adapted, in a region remote from the slits 8d, to the external contour of the turbine wheel 4. The connecting rim 22 can then be connected to the outer shell of the turbine wheel 4 by a weld 22a.

There can preferably be an axially and circumferentially rigid connection between the carrier plate or hub disc 13 and the hub 12. In order to facilitate this connection, the carrier plate or hub disc 13 can have the internal toothing 16.

Further, the hub 12 has the ring land 18, which ring land 18 can preferably be disposed near the outermost circumferential area of the hub 12. The hub 12 can also have the groove 17, which groove 17 can be disposed within the hub 12 and adjacent the ring land 18. The carrier plate or hub disc 13 can be connected to the piston 7 by the plurality of tangential leaf springs 14, which leaf springs 14 can preferably be distributed around the circumference of the carrier plate or hub disc 13. The leaf springs 14 can be mounted by rivets 14a and 14b. The rivet 14a attaches the leaf spring 14 to the piston 7, and the rivet 14b preferably attaches the leaf spring 14 to the carrier plate or hub disc 13.

As best shown in FIG. 2a, the carrier plate or hub disc 13 can have a plurality of projections 13d, which projections 13d can be distributed along the outer circumference of the carrier plate or hub disc 13. The projections 13d preferably project radially outward from the carrier plate or hub disc 13. Thus, one of the rivets 14b can be disposed within one of the projections 13d, preferably attaching one end of a leaf spring 14 to the carrier plate or hub disc 13.

In order to fix the carrier plate or hub disc 13 rigidly to the hub 12, the ring land 18 can be forced, and thus deformed, into the internal teeth 16 of the carrier plate or hub disc 13. This deformation can be carried out by using the groove 17, and a specially designed tool for being forced into the groove 17. The process of deforming the ring land 18 may essentially be described as being similar to cold-welding or pressure welding. Thus, even after extended use, the carrier plate or hub disc 13 can remain firmly and immovably attached to the hub 12. Therefore, any vibrations which can occur in the transmission, and which can be transmitted to the carrier plate or the hub 12, will preferably not cause rattling or chattering in the vicinity of the carrier plate or hub disc 13 or the hub 12.

The guide hub 12 can be provided with a duct 12a, which duct 12a can preferably be disposed in the region between the seal 11 and the housing wall 2. The duct 12a can serve to feed pressurized converter fluid into the area between the housing wall 2 and the piston 7. Further, on each side of the rotor hub 20, there can be disposed thrust bearings 20a and 20b. Further, a thrust ring 19a can be disposed between the hub 19 and the hub 12.

In FIG. 1a, the clutch components, namely the piston 7, the frictional surfaces 8a and 8b of the piston 7, the friction plate 8 and the frictional surfaces 8e and 8f of the friction plate 8, may be shown while the bridging or lockup clutch 6 is in a disengaged configuration. Further, while the bridging or lockup clutch 6 is in a disengaged configuration, the inner circumferential area 7a of the piston 7 may contact the inner circumferential area 13a of the carrier plate or hub disc 13.

Figure 1B:
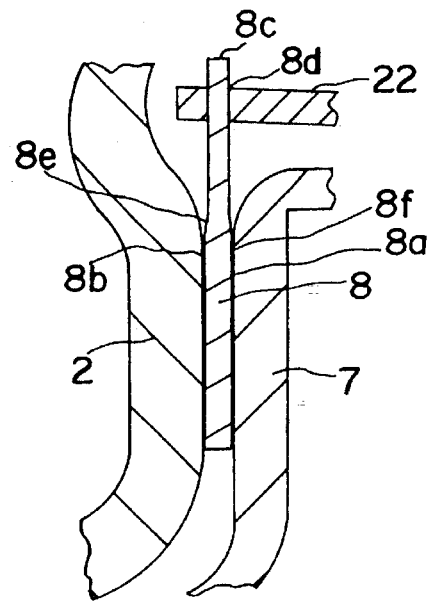
FIG. 1b shows an enlarged view of the friction surfaces with the bridging or lockup clutch in an engaged position.
Figure 1C:
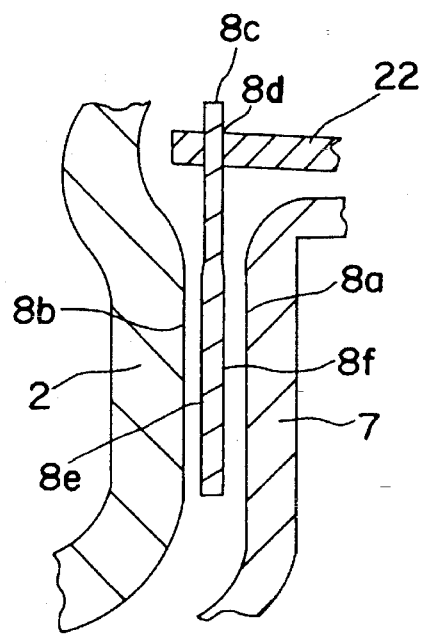
FIG. 1c shows an enlarged view of the friction surfaces with the bridging or lockup clutch in a disengaged position.

The functioning of the bridging or lockup clutch 6 in the torque converter 1 can be described as follows. Preferably during torque transmission from the pump wheel 3 to the turbine wheel 4, the bridging or lockup clutch 6 can be opened by converter fluid being admitted under pressure, via the duct 12a into space 2c, between the drive-side housing wall 2 and the piston 7. This admission of fluid can cause the piston 7 to be displaced axially towards the turbine wheel 4, until the piston 7 comes into contact with the carrier plate or hub disc 13. As a consequence of the axial displacement of the piston 7 towards the turbine wheel 4, the friction plate 8 can be disposed freely between the friction surfaces 8a and 8b, and the friction plate 8 can revolve freely with the turbine wheel 4, as shown in FIG. 1c. Since the carrier plate or hub disc 13 can be disposed between the turbine wheel 4 and the piston 7, the carrier plate 13 can serve as an axial stop. In torque converters of the past, an additional axial stop was typically necessary because the carrier plate 13 was generally disposed between the piston 7 and the housing wall 2. In the present invention, since the carrier plate or hub disc 13 can be disposed between the piston 7 and the turbine wheel 4, the carrier plate or hub disc 13 can serve as the axial stop to the piston 7.

In order to engage the bridging or lockup clutch 6, the internal space 2e of the torque converter 1 can be pressurized by connecting the internal space 2e to the delivery side of a converter fluid pump (not shown). The internal space 2c between the housing wall 2 and the piston 7 can be relieved of pressure via the duct 12a, so that a pressure difference can be produced. This pressure difference can then cause the piston 7 to move to the left, towards the housing wall 2. This movement by the piston 7 towards the housing wall 2 can then cause the friction surfaces 8a and 8b to preferably clamp the friction plate 8 between them and thus engage the bridging or lockup clutch 6, as shown in FIG. 1b. During this engagement of the bridging or lockup clutch 6, sealing can take place at the friction surfaces 8a and 8b, so that pressure in the torque converter 1 can automatically build up. The transmission of the torque can now take place directly from the converter housing wall 2, via the friction plate 8, to the friction surface 8b, and via the carrier plate or hub disc 13, to the leaf springs 14 and the piston 7, and then to to the friction surface 8a. The result can be that the friction plate 8 can transfer the torque to the connecting rim 22, and thus to the turbine wheel 4. The torque can thus be transmitted one half at the friction surface 8b, and one half at the friction surface 8a. As a consequence, the torque transmission to the piston 7 via the internal teeth 16 only needs to be one half of the value of the total torque.

Figure 3:
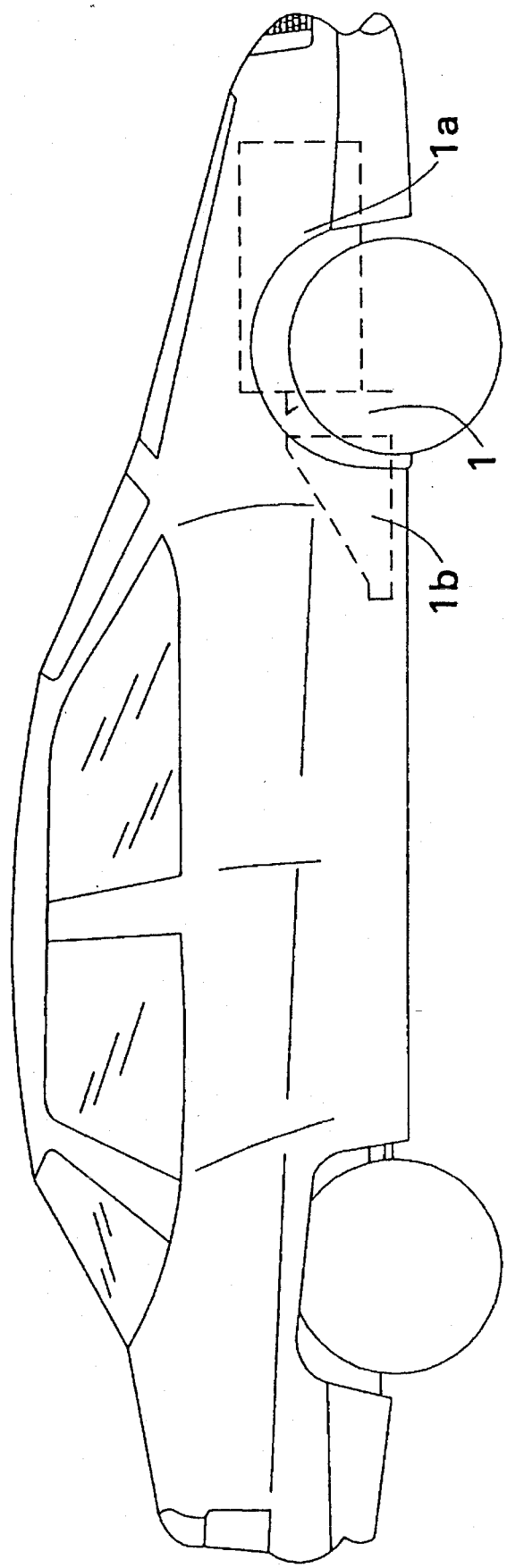
FIG. 3 shows a typical motor vehicle having a torque converter.

FIG. 3 shows what could be considered to be a typical automobile. Such an automobile will typically have an internal combustion engine 1a mounted in a forward portion thereof. The automobile will also typically have a transmission 1b, and a drive shaft (not shown) for transmitting mechanical power generated by the engine 1a to the wheels. Further, if the transmission 1b is an automatic transmission, the drive train will also typically have a torque converter 1, for engaging the engine 1a with the transmission 1b.

Further, the present invention may operate in a manner analogous to the torque converter disclosed in U.S. Pat. No. 4,926,988, cited on page one of the specification of this patent application.

One feature of the invention resides broadly in the hydrodynamic or hydrokinetic torque converter, comprising a converter housing driven by an internal combustion engine, a turbine wheel mounted on a drive shaft, possibly a guide wheel, a bridging or lockup clutch to bridge the converter circuit by coupling the turbine wheel to the converter housing by means of a friction clutch, a piston with a frictional surface in the vicinity of the piston clutch's outside circumference on the side facing the converter housing, which in the piston's radially inner area is guided tightly and in a non-rotating fashion but so that the piston can move axially on a hub fastened to the converter housing, at least one friction plate between the frictional surface of the piston and a corresponding frictional surface on the converter housing, characterized by the fact that on the hub 12, on the side of the piston 7 facing away from the converter housing 2, there is a carrier plate or hub disc 13 fastened rigidly axially and circumferentially and without play, which carrier plate or hub disc 13 guides the piston 7 by means of tangential leaf springs 14 so that the piston 7 does not rotate, but the piston 7 can move axially.

Another feature of the invention resides broadly in the torque converter, characterized by the fact that radially inside the carrier plate or hub disc 13 in the hub 12, there is a concentric, open groove 17 which faces away from the converter housing 2, so that a ring land 18 is formed, which is plastically deformed radially outward to hold the carrier plate or hub disc 13 on the ring land 18.

Still another feature of the invention resides broadly in the torque converter, characterized by the fact that the carrier plate or hub disc 13 has an internal toothing 16, into which internal toothing 16 the ring land 18 is plastically deformed.

Yet still another feature of the invention resides broadly in the torque converter, characterized by the fact that the tangential leaf springs 14 exert an axial prestress on the piston 7 to reduce the distance between the piston 7 and the converter housing 2.

Types of torque converters in which the present invention may be incorporated may be disclosed by the following patents: U.S. Pat. No. 4,263,822 to Harmon on Apr. 28, 1981, entitled "Multirange Transmissions"; U.S. Pat. No. 3,953,970 to Fuehrer et al. on May 4, 1976, entitled "Torque Converter Transmission"; U.S. Pat. No. 5,065,853 to Fujimoto et al. on Nov. 19, 1991, entitled "Lockup Clutch of Torque Converter"; U.S. Pat. No. 4,468,989 to Rosen on Sep. 4, 1984, entitled "Power Transmission Mechanism with a Hydrokinetic Torque Converter Having a Lockup Clutch"; U.S. Pat. No. 4,382,496 to Yamamori et al. on May 10, 1983, entitled "Torque Converter with Lockup Clutch Unit"; and U.S. Pat. No. 4,071,125 to Jameson on Jan. 31, 1978, entitled "Power Transmission with Torque Converter Lockup Clutch";

All of the patents, patent applications and publications recited herein are hereby incorporated by reference as if set forth in their entirety herein.

The invention as described hereinabove in the context of the preferred embodiments is not to be taken as limited to all of the provided details thereof, since modifications and variations thereof may be made without departing from the spirit and scope of the invention.

What is claimed is:

1. A hydrokinetic lockup torque converter such as for an automobile, said lockup torque converter comprising:

a turbine wheel disposed on a first shaft;

a converter housing configured to be driven by a second shaft of an internal combustion engine and to house said torque converter;

a lockup clutch disposed between said turbine wheel and said converter housing and configured to couple said turbine wheel to said converter housing;

said lockup clutch comprising:
      a piston, said piston being disposed between said converter housing and said turbine wheel;
      a friction plate, said friction plate being disposed between said piston and said converter housing;

an axis of rotation;

said torque converter defining:
      an axial direction substantially parallel to the axis of rotation;
      a circumferential direction about the axis of rotation;
      a radial direction substantially perpendicular to the axial direction;

a first hub, said first hub being disposed and fastened to rotate with said converter housing about the axis of rotation;

said piston being disposed about said first hub to move in the axial direction along said first hub;

a hub disc, said hub disc being mounted on said first hub and disposed between said turbine wheel and said piston;

means for connecting said piston and said hub disc, said connecting means for attaching and driving said piston and said hub disc as a unit about the axis of rotation; and said hub disc being fastened rigidly and immovably to said first hub to provide no play between said hub disc and said first hub in all three of: the axial direction, the circumferential direction, and the radial direction.

2. A torque converter according to claim 1 wherein said torque converter further comprises means for attaching, said attaching means for connecting said hub disc to said piston to permit said piston to move in the axial direction but not substantially in the circumferential direction.

3. A torque converter according to claim 2 wherein:

said first hub comprises an outer portion, said outer portion being disposed radially inward from said hub disc and adjacent said hub disc;

said hub disc comprises means for receiving, said receiving means being configured to receive said outer portion of said first hub; and said outer portion having been deformed to make contact with and be received by said means for receiving.

4. A torque converter according to claim 3 wherein:

said hub disc comprises an inner circumference and an outer circumference;

said inner circumference is disposed adjacent said hub;

said outer circumference is disposed concentrically outside of said inner circumference;

said receiving means comprises:
      a plurality of teeth disposed along said inner circumference of said hub disc; and
      a plurality of spaces disposed between ones of said plurality of teeth.

5. A torque converter according to claim 4 wherein said outer portion of said first hub is deformed into said hub disc to make said contact with ones of said plurality of teeth and ones of said plurality of spaces.

6. A torque converter according to claim 5 wherein: said hub comprises a recess, said recess being disposed radially inward from said outer portion and adjacent said outer portion;

said recess being disposed concentrically within said first hub and extending only partially into said first hub in the axial direction;

7. A torque converter according to claim 6 wherein:

said attaching means comprises:

at least one leaf spring, said at least one leaf spring having a first end and a second end; and said first end of said leaf spring is fastened to said hub disc and said second end of said leaf spring is fastened to said piston.

8. A torque converter according to claim 7 wherein:

the first shaft comprises a transmission input shaft;

the second shaft comprises a crankshaft of the internal combustion engine;

said at least one leaf spring comprises a plurality of leaf springs;

said outer portion comprises deformable material;

said torque converter further comprises:

a pump wheel disposed adjacent said turbine wheel;
at least two rivets, one of said at least two rivets is disposed within said first end of said at least one leaf spring to fasten said first end of said at least one leaf spring to said hub disc;
the other of said at least two rivets is disposed within said second end of said at least one leaf spring to fasten said second end of said at least one leaf spring to said piston;
said friction plate comprises:
an outer circumference and an inner circumference;
said outer circumference of said friction plate is disposed concentrically outside said inner circumference of said friction plate;
a first friction surface and a second friction surface;
said first friction surface of said friction plate is disposed to face towards said converter housing;
said second friction surface of said friction plate is disposed to face away from said converter housing;
said lockup clutch further comprises:
a connecting rim having a first end and a second end;
said first end of said connecting rim is disposed at said outer circumference of said friction plate;
said second end of said connecting rim is attached to said turbine wheel;
said friction plate further comprises:
a plurality of slots disposed at said outer circumference of said friction plate;
said connecting rim comprises:
a plurality of portions disposed within said ones of said plurality of slots of said friction plate to permit movement of said friction plate in the axial direction;
said piston further comprises:
an inner circumference and an outer circumference;
said outer circumference of said piston is disposed concentrically outside of said inner circumference of said piston;
said outer circumference of said piston is disposed adjacent said friction plate;
a first flange and a second flange;
said first flange is disposed along said inner circumference of said piston and extends in the axial direction away from said turbine wheel;
said second flange is disposed along said outer circumference of said piston and extends in the axial direction in an opposite direction of said first flange away from said converter housing;
said first flange is disposed adjacent said first hub and is configured to slidably move along said first hub;
said hub disc comprises an inner circumference and an outer circumference;
said inner circumference is disposed adjacent said first hub;
said outer circumference is disposed concentrically outside of said inner circumference;
said torque converter further comprising:
a seal disposed between said second flange of said piston and said first hub;
an inlet for pressurized oil disposed between said converter housing and said first hub;
a second hub being disposed in the axial direction from and adjacent said first hub;
said second hub being attached to said turbine wheel;
a first bearing disposed between said first hub and said second hub;
a third hub disposed in the axial direction from and adjacent said second hub;
said third hub having a first side and a second side;
said first side disposed adjacent said second hub;
a second bearing disposed between said second hub and said third hub and adjacent said first side of said third hub;
a third bearing disposed adjacent said second side of said third hub;
a guide hub attached to said converter housing;
a guide wheel disposed between said turbine wheel and said pump wheel;
said converter housing comprises:
an upper portion disposed adjacent said connecting rim;
a side portion disposed adjacent said pump wheel;
said upper portion being attached to said side portion;
said hub disc further comprises:
a plurality of projections, said plurality of projections of said hub disc extend radially outward along the outer circumference of said hub disc; and
a plurality of recesses, ones of said plurality of recesses are disposed between ones of said plurality of projections of said hub disc.

9. A hydrokinetic lockup torque converter, such as for an automobile, said lockup torque converter comprising:
a turbine wheel being disposed on a first shaft;
a converter housing being configured to be driven by a second shaft of an internal combustion engine and to house said torque converter;
a lockup clutch being disposed between said turbine wheel and said converter housing and configured to couple said turbine wheel to said converter housing;
said lockup clutch comprising:
a piston, said piston being disposed between said converter housing and said turbine wheel;
a friction plate, said friction plate being disposed between said piston and said converter housing; an axis of rotation;
said torque converter defining:
an axial direction substantially parallel to the axis of rotation;
a circumferential direction about the axis of rotation;
a radial direction substantially perpendicular to the axial direction;
a first hub, said first hub being disposed and fastened to rotate with said converter housing about the axis of rotation; said piston being disposed about said first hub to move in the axial direction along said first hub;
a hub disc, said hub disc is fastened rigidly and immovably to said first hub to provide no play between said hub disc and said first hub in all three of the axial direction, the circumferential direction, and the radial direction; and
means for connecting said piston and said hub disc, said connecting means for attaching and driving said piston and said hub disc as a unit about the axis of rotation.

10. A torque converter according to claim 9 wherein said hub disc is disposed between said turbine wheel and said piston.

11. A torque converter according to claim 10 wherein said torque converter further comprises means for attaching, said attaching means for connecting said hub disc to said piston to permit said piston to move substantially in the axial direction but not in the circumferential direction.

12. A torque converter according to claim 11 wherein:
said first hub comprises an outer portion, said outer portion being disposed radially inward from said hub disc and adjacent said hub disc;

said hub disc comprises means for receiving, said receiving means being configured to receive said outer portion of said first hub; and said outer portion having been deformed to make contact with and be received by said means for receiving.

13. A torque converter according to claim 12 wherein:

said hub disc comprises an inner circumference and an outer circumference;

said inner circumference is disposed adjacent said hub;

said outer circumference is disposed concentrically outside of said inner circumference;

said receiving means comprises:
 a plurality of teeth disposed along said inner circumference of said hub disc; and
 a plurality of spaces disposed between ones of said plurality of teeth.

14. A torque converter according to claim 13 wherein said outer portion of said first hub is deformed into said hub disc to make said contact with ones of said plurality of teeth and ones of said plurality of spaces.

15. A torque converter according to claim 14 wherein:

said hub comprises a recess, said recess being disposed radially inward from said outer portion and adjacent said outer portion;

said recess being disposed concentrically within said first hub and extending only partially into said first hub in the axial direction;

16. A torque converter according to claim 15 wherein: said attaching means comprises:
 at least one leaf spring, said at least one leaf spring having a first end and a second end; and
 said first end of said leaf spring is fastened to said hub disc and said second end of said leaf spring is fastened to said piston.

17. A torque converter according to claim 16 wherein:

the first shaft comprises a transmission input shaft;

the second shaft comprises a crankshaft of the internal combustion engine;

said at least one leaf spring comprises a plurality of leaf springs;

said outer portion comprises deformable material;

said torque converter further comprises:
 a pump wheel disposed adjacent said turbine wheel;
 at least two rivets, one of said at least two rivets is disposed within said first end of said at least one leaf spring to fasten said first end of said at least one leaf spring to said hub disc;
 the other of said at least two rivets is disposed within said second end of said at least one leaf spring to fasten said second end of said at least one spring to said piston;

said friction plate comprises:
 an outer circumference and an inner circumference;
 said outer circumference of said friction plate is disposed concentrically outside said inner circumference of said friction plate;
 a first friction surface and a second friction surface;
 said first friction surface of said friction plate is disposed to face towards said converter housing;
 said second friction surface of said friction plate is disposed to face away from said converter housing;

said lockup clutch further comprises:
 a connecting rim having a first end and a second end;
 said first end of said connecting rim is disposed at said outer circumference of said friction plate;
 said second end of said connecting rim is attached to said turbine wheel;

said friction plate further comprises:
 a plurality of slots disposed at said outer circumference of said friction plate;
 said connecting rim comprises:
 a plurality of portions disposed within said ones of said plurality of slots of said friction plate to permit movement of said friction plate in the axial direction;

said piston further comprises:
 an inner circumference and an outer circumference;
 said outer circumference of said piston is disposed concentrically outside of said inner circumference of said piston;
 said outer circumference of said piston is disposed adjacent said friction plate;
 a first flange and a second flange;
 said first flange is disposed along said inner circumference of said piston and extends in the axial direction away from said turbine wheel;
 said second flange is disposed along said outer circumference of said piston and extends in the axial direction in an opposite direction of said first flange away from said converter housing;
 said first flange is disposed adjacent said first hub and is configured to slidably move along said first hub;

said hub disc comprises an inner circumference and an outer circumference;

said inner circumference is disposed adjacent said first hub;

said outer circumference is disposed concentrically outside of said inner circumference;

said torque converter further comprising:
 a seal disposed between said second flange of said piston and said first hub;
 an inlet for pressurized oil disposed between said converter housing and said first hub;
 a second hub being disposed in the axial direction from and adjacent said first hub;
 said second hub being attached to said turbine wheel;
 a first bearing disposed between said first hub and said second hub;
 a third hub disposed in the axial direction from and adjacent said second hub;
 said third hub having a first side and a second side;
 said first side disposed adjacent said second hub;
 a second bearing disposed between said second hub and said third hub and adjacent said first side of said third hub;
 a third bearing disposed adjacent said second side of said third hub;
 a guide hub attached to said converter housing;
 a guide wheel disposed between said turbine wheel and said pump wheel;

said converter housing comprises:
 an upper portion disposed adjacent said connecting rim;
 a side portion disposed adjacent said pump wheel;
 said upper portion being attached to said side portion;

said hub disc further comprises:
 a plurality of projections, said plurality of projections of said hub disc extend radially outward along the outer circumference of said hub disc; and
 a plurality of recesses, ones of said plurality of recesses are disposed between ones of said plurality of projections of said hub disc.

18. A method of making a hydrokinetic lockup torque converter, such as for an automobile, the lockup torque converter comprising: a turbine wheel being disposed on a first shaft; a converter housing being configured to be driven by a second shaft of an internal combustion engine and to house the torque converter; a lockup clutch being disposed between the turbine wheel and the converter housing and configured to couple the turbine wheel to the converter housing; the lockup clutch comprising: a piston, the piston being disposed between the converter housing and the turbine wheel; a friction plate, the friction plate being disposed between the piston and the converter housing; an axis of rotation; the torque converter defining: an axial direction substantially parallel to the axis of rotation; a circumferential direction about the axis of rotation; a radial direction substantially perpendicular to the axial direction; a first hub, the first hub being disposed and fastened to rotate with the converter housing about the axis of rotation; the piston being disposed about the first hub to move in the axial direction along the first hub; a hub disc, the hub disc being mounted on the first hub and disposed between the turbine wheel and the piston; and means for connecting the piston and the hub disc, the connecting means for attaching and driving the piston and the hub disc as a unit about the axis of rotation; said method of making a torque converter comprising the steps of:

providing a turbine wheel;

disposing the turbine wheel on a first shaft;

providing a converter housing;

configuring the converter housing to be driven by a second shaft of an internal combustion engine and to house the torque converter;

providing a lockup clutch;

disposing the lockup clutch between the turbine wheel and the converter housing;

configuring the lockup clutch to couple the turbine wheel to the converter housing;

said providing of said lockup clutch comprising:
providing a piston;
disposing the piston between the converter housing and the turbine wheel;
providing a friction plate;
disposing the friction plate between the piston and the converter housing;

providing a first hub;

disposing the first hub and fastening the first hub to rotate with the converter housing about the axis of rotation;

disposing the piston about the first hub to move in the axial direction along the first hub;

providing a hub disc;

mounting the hub disc on the first hub;

providing means for connecting;

deforming the outer portion of the first hub to make contact with the hub disc to fasten the hub disc rigidly and immovably to the first hub to provide no play between the hub disc and the first hub in all three of the axial direction, the circumferential direction, and the radial direction; and attaching and driving the piston and the hub disc as a unit about the axis of rotation with the connecting means.

19. The method according to claim 18 wherein:
said method further comprises:
said providing of the connecting means comprises:
providing means for attaching, the attaching means connecting the hub disc to the piston with the attaching means to permit the piston to move substantially in the axial direction but not in the circumferential direction;

said providing of the first hub comprises:
providing an outer portion;
disposing the outer portion of said first hub radially inward from the hub disc and adjacent the hub disc;

said providing of the hub disc comprises:
providing means for receiving;
configuring the receiving means to receive the outer portion of the first hub; and said providing of the hub disc comprises:
providing an inner circumference and an outer circumference;

disposing the inner circumference of the hub disc adjacent said first hub;

disposing the outer circumference of the hub disc concentrically outside of the inner circumference;

said providing of said receiving means comprises:
providing a plurality of teeth;
disposing the plurality of teeth along the inner circumference of the hub disc; and
providing a plurality of spaces;
disposing the plurality of spaces between ones of the plurality of teeth;

deforming the outer portion of the first hub to make the contact with ones of the plurality of teeth and ones of the plurality of spaces;

said providing of the hub comprises:
providing a recess;
disposing the recess radially inward from the outer portion and adjacent the outer portion;
disposing the recess concentrically within the first hub and extending the recess only partially into the first hub in the axial direction;

said providing of the attaching means comprises:
providing at least one leaf spring;
providing a first end and a second end;
fastening the first end of the leaf spring to the hub disc and fastening the second end of the leaf spring to the piston;

said providing of at least one leaf spring comprises:
a plurality of leaf springs;

said providing of the outer portion comprises:
providing deformable material; said method further comprises the steps of:
providing a pump wheel;
disposing the pump wheel adjacent the turbine wheel;
providing at least two rivets;
disposing one of the at least two rivets within the first end of the at least one leaf spring and fastening the first end of the at least one leaf spring to the hub disc;
disposing the other of the at least two rivets within the second end of the at least one leaf spring to and fastening the second end of the at least one spring to the piston;

said providing of the friction plate comprises:
providing an outer circumference and an inner circumference;
disposing the outer circumference of the friction plate concentrically outside the inner circumference of the friction plate;

providing a first friction surface and a second friction surface;
disposing the first friction surface of the friction plate to face towards the converter housing;
disposing the second friction surface of the friction plate to face away from the converter housing;
said providing of the lockup clutch further comprises:
providing a connecting rim:
said providing of the connecting rim comprises:
providing a first end and a second end;
disposing the first end of the connecting rim at the outer circumference of the friction plate;
attaching the second end of the connecting rim to the turbine wheel;
said providing of the friction plate further comprises:
disposing a plurality of slots at the outer circumference of the friction plate;
said providing of the connecting rim further comprises:
providing a plurality of portions;
disposing the plurality of portions within the ones of the plurality of slots of the friction plate to permit movement of the friction plate in the axial direction; said providing of the piston further comprises:
providing an inner circumference and an outer circumference;
disposing the outer circumference of the piston concentrically outside of the inner circumference of the piston;
disposing the outer circumference of the piston adjacent the friction plate;
providing a first flange and a second flange;
disposing the first flange along the inner circumference of the piston and extending the first flange in the axial direction away from the turbine wheel;
disposing the second flange along the outer circumference of the piston and extending the second flange in the axial direction in an opposite direction of the first flange away from the converter housing;
disposing the first flange adjacent the first hub and configuring the first flange to slidably move along the first hub;
said providing of the hub disc comprises:
providing an inner circumference and an outer circumference;
disposing the inner circumference adjacent the first hub;
disposing the outer circumference concentrically outside of the inner circumference;
said method further comprising the steps of:
providing a seal:
disposing the seal between the second flange of the piston and the first hub;
providing an inlet for pressurized oil;
disposing the inlet between the converter housing and the first hub;
providing a second hub;
disposing the second hub in the axial direction from and adjacent the first hub;
attaching the second hub to the turbine wheel;
providing a first bearing;
disposing the first bearing between the first hub and the second hub;
providing a third hub;
disposing the third hub in the axial direction from and adjacent the second hub;
said providing of the third hub comprises:
providing a first side and a second side;
disposing the first side adjacent the second hub;
providing a second bearing;
disposing the second bearing between the second hub and the third hub and adjacent the first side of the third hub;
providing a third bearing;
disposing the third bearing adjacent the second side of the third hub;
providing a guide hub;
attaching the guide hub to the converter housing;
providing a guide wheel;
disposing the guide wheel between the turbine wheel and the pump wheel;
said providing of the converter housing comprises:
providing an upper portion;
disposing the upper portion adjacent the connecting rim;
providing a side portion;
disposing the side portion adjacent the pump wheel;
attaching the upper portion to the side portion;
said providing of the hub disc further comprises:
providing a plurality of projections;
extending the plurality of projections of the hub disc radially outward along the outer circumference of the hub disc;
providing a plurality of recesses; and
disposing ones of said plurality of recesses between ones of the plurality of projections of the hub disc.

* * * * *